United States Patent
Barber et al.

(10) Patent No.: US 11,243,007 B2
(45) Date of Patent: Feb. 8, 2022

(54) SYSTEM AND METHOD FOR A CONTROLLED ENVIRONMENT

(71) Applicants: Randal S. Barber, Marysville, WA (US); Robert A. Stevens, Stanwood, WA (US)

(72) Inventors: Randal S. Barber, Marysville, WA (US); Robert A. Stevens, Stanwood, WA (US)

(73) Assignee: BETELGEUSE TECHNOLOGIES, LLC, Tulalip, WA (US)

( * ) Notice: Subject to any disclaimer, the term of this patent is extended or adjusted under 35 U.S.C. 154(b) by 0 days.

(21) Appl. No.: 15/627,742

(22) Filed: Jun. 20, 2017

(65) Prior Publication Data

US 2017/0363314 A1    Dec. 21, 2017

Related U.S. Application Data

(60) Provisional application No. 62/352,883, filed on Jun. 21, 2016.

(51) Int. Cl.
*F24F 11/62* (2018.01)
*H05B 47/19* (2020.01)
(Continued)

(52) U.S. Cl.
CPC .............. *F24F 11/62* (2018.01); *G05B 15/02* (2013.01); *H05B 47/105* (2020.01); *H05B 47/11* (2020.01);
(Continued)

(58) Field of Classification Search
CPC ...... H05B 47/19; H05B 47/11; H05B 47/105; F24F 11/62; F24F 2221/38;
(Continued)

(56) References Cited

U.S. PATENT DOCUMENTS 6,491,051 B2 * 12/2002 Pierce .................... E04H 15/12
135/120.3
6,945,064 B2 * 9/2005 Jebaraj ...................... F24F 1/04
62/259.1
(Continued)

FOREIGN PATENT DOCUMENTS

WO    2008154444 A1    12/2008

OTHER PUBLICATIONS

International Search Report and Written Opinion for PCT/US2017/038165, dated Sep. 26, 2017, 9 pages.

*Primary Examiner* — Mohammad Ali
*Assistant Examiner* — Sheela Rao
(74) *Attorney, Agent, or Firm* — Richard Thomas Black; Foster Garvey PC

(57) ABSTRACT

An integrated system and process provides integrated control of the environment within a personal space. A tent or other structure suitable for forming a personal space, is in contact with, and may enclose, a user station. The system includes a control system, main controller, control modules, sensors, environmental units and other controllers that operate in an integrated fashion to provide a controlled environment within the personal space. The tent may enclose all or portions of the control system, main controller, control modules, sensors, environmental units and other controllers. Portions of the control system, main controller, control modules, sensors, environmental units and other controllers may reside outside tent. A process for providing environmental control of the personal space includes learning capabilities.

8 Claims, 5 Drawing Sheets

(51) Int. Cl.
*H05B 47/11* (2020.01)
*H05B 47/105* (2020.01)
*G05B 15/02* (2006.01)
*F24F 120/10* (2018.01)

(52) U.S. Cl.
CPC .......... *H05B 47/19* (2020.01); *F24F 2120/10* (2018.01); *F24F 2221/38* (2013.01); *G05B 2219/2642* (2013.01); *Y02B 20/40* (2013.01)

(58) Field of Classification Search
CPC ................ F24F 2120/10; G05B 15/02; G05B 2219/2642; Y02B 20/40
USPC ........................................................ 700/278
See application file for complete search history.

(56) References Cited

U.S. PATENT DOCUMENTS

| | | | |
|---|---|---|---|
| 2008/0169013 A1* | 7/2008 | Brockel | E04H 15/14 |
| | | | 135/93 |
| 2008/0277486 A1 | 11/2008 | Seem et al. | |
| 2011/0066465 A1* | 3/2011 | Orfield | F24F 11/30 |
| | | | 705/7.32 |
| 2013/0243240 A1* | 9/2013 | Marks | F24F 11/30 |
| | | | 382/103 |
| 2013/0274930 A1 | 10/2013 | George | |
| 2015/0136862 A1 | 5/2015 | Wolf, II | |
| 2017/0291544 A1* | 10/2017 | Ishihara | B60K 37/06 |

\* cited by examiner

SYSTEM AND METHOD FOR A CONTROLLED ENVIRONMENT

PRIORITY CLAIM

This application claims the benefit of U.S. Provisional Patent Application Ser. No. 62/352,883 filed Jun. 21, 2016, the entirety of which is hereby incorporated by reference as if fully set forth herein.

FIELD OF THE INVENTION

The present invention relates generally to environmental systems and, particularly to controlled environments for personal space.

BACKGROUND OF THE INVENTION

Large-scale environmental systems, such as whole-building HVAC systems, are used to provide comfortable environments for tenants, employees and other persons occupying the space. At the same time, those same conditions are likely agreeable to plants and other architectural elements inside the space. The system may control lighting, temperature, humidity and ambient noise. Such systems are intended to provide an overall controlled environment for the entire building. There may be local controls, such as thermostats and lighting switches in certain areas, such as individual floors, conference rooms and offices. These local controls are generally limited to controlling single parameters, such as lights or temperature.

In the home, a central heating and air conditioning system typically controls the internal environment of the entire house. The occupants typically have limited local control through individual light switches, thermostats, or by adjusting air vents in rooms. Such local control is typically limited to single parameters and is further limited to fixed areas of the house, such as a family room. None of these systems provide a personalizable environment in which multiple parameters are integrated and controllable by an individual. Accordingly, there is a need for an integrated system and method for a controlled environment suitable for personable space.

BRIEF DESCRIPTION OF THE FIGURES

A more complete understanding of the present invention may be derived by referring to the detailed description and claims when considered in connection with the following illustrative figures:

Elements and steps in the figures are illustrated for simplicity and clarity and have not necessarily been rendered according to any particular sequence. For example, steps that may be performed concurrently or in different order are illustrated in the figures in an exemplary order to help to improve understanding of embodiments of the present invention.

DETAILED DESCRIPTION OF THE PREFERRED EMBODIMENT

Various aspects of the present invention may be described in terms of functional block components and various process steps. Such functional blocks may be realized by any number of hardware or software components configured to perform the specified functions and achieve the various results. For example, exemplary embodiments of the present invention may employ various sensors, components and devices responsive to and affecting various parameters, such as, by way of example, temperature, light, sound, humidity and the like. In addition, various aspects of the present invention may be practiced in conjunction with any number of computation components, and the systems and methods described are merely exemplary embodiments and applications of the present invention. Further, exemplary embodiments of the present invention may employ any number of conventional techniques for sensing and affecting environmental parameters such as air handling, temperature, lighting, humidity, auditory and visual parameters and the like. In addition to a system and apparatus for providing a controlled environment in an enclosed personal space, also disclosed is a method for achieving the desired environment, including various learning methods.

Figure 1:
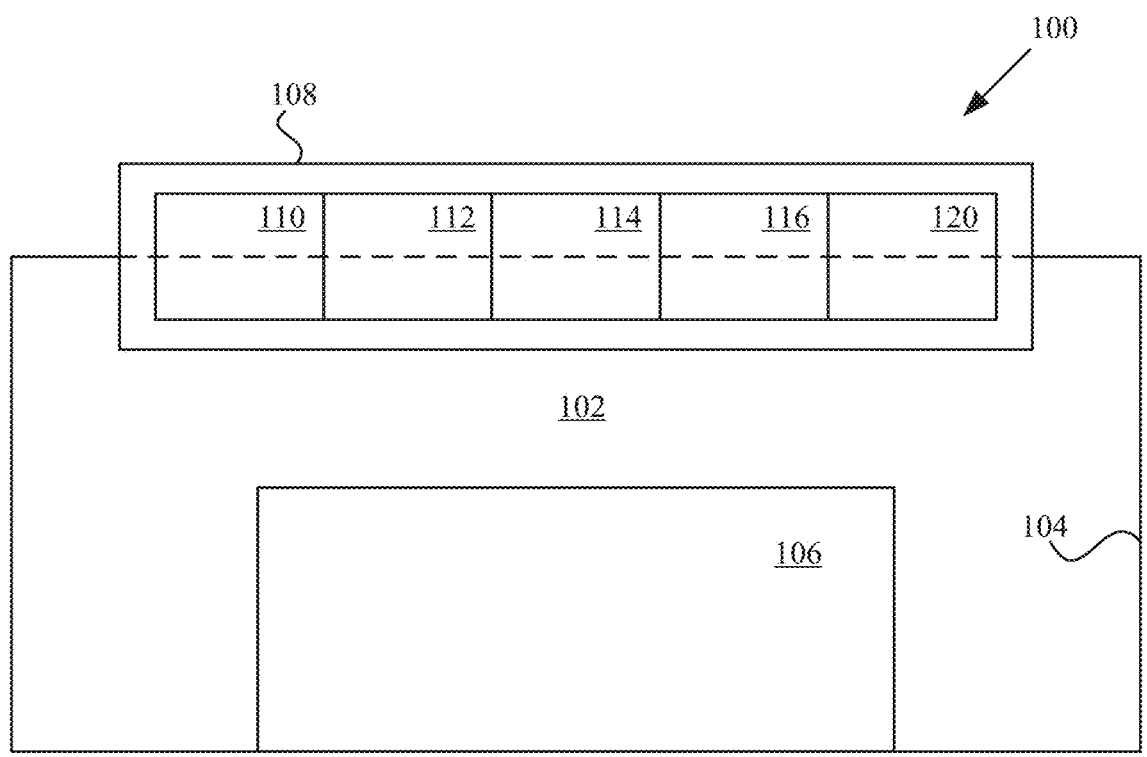
FIG. 1 is block diagram of an integrated system providing a controlled personal environment in accordance with a preferred embodiment of the present invention.

FIG. 1 illustrate an integrated system 100 for controlling the environment within a personal space 102 in accordance with a preferred embodiment of the present invention. A tent 104 or other structure suitable for forming a personal space, such as structural walls or portable panels, is in contact with, and may enclose, a user station 106. System 100 further includes a control system 108, main controller 110, control modules 112, sensors 114, environmental units 116 and other controllers 120 that operate in an integrated fashion to provide a controlled environments within personal space 102. The tent 104 may enclose all or portions of the control system 108, main controller 110, control modules 112, sensors 114, environmental units 116 and other controllers 120. Likewise portions of the control system 108, main controller 110, control modules 112, sensors 114, environmental units 116 and other controllers 120 may reside outside tent 104.

Various representative implementations of the present invention may be applied to an integrated system 100 for creating a controlled environment inside a personal, enclosed space 102. These various components or systems may be connected or interact with other components in any number of ways. They may also be composed of, interact with, contain, manage, or control various other components. What follows here are some exemplary embodiments of a small number of possible variations of the invention. In no way should the embodiments described herein be read to limit the invention to only those described herein. It is understood that many other arrangements, systems, or methods may be used with the invention and the preceding and following descriptions do not prevent those uses not specifically described herein.

The integrated system 100 provides a desired environment for a user by providing a controlled physical environment in the personal space 102 around the user station 106. Personal space 102, as defined by tent 104, exists above or around the user station 106, is modified and controlled by the environmental control system 108. Control system 108 preferably includes a main controller 110, control modules 112, sensors 114, environmental unit 116 and other controllers 120. Main controller 110, may be a conventional computer-controlled device, such as, for example, a microprocessor based controller, that drives, among other components and systems, environmental unit 116 to create the optimum experience for the user in space 102. Preferably, various sensors 114 provide continuous monitoring to ensure a stable and desired environment is obtained and maintained within space 102. As an example: sensors 114 may sense parameters such as temperature, humidity, air quality, air movement, lighting, sound, visuals, movement, etc. and are configured to allow integrated system 100 to optionally and individually adjust, in an integrated fashion, parameters to a user's preference within space 102.

The user station 106 represents the area the user touches or otherwise interacts with by sitting, laying, standing, etc. Non-limiting examples of user station 106 include a bed, chair, couch, cot, mat, or any other type of commercially available or proprietary furniture or other fixture desired by the user. It may also simply include the floor.

The environmental enclosure (tent 104), provides a barrier or boundary, in conjunction with the user station 106, to establish the controlled environment in space 102 corresponding to the inner volume inside the tent 104. The tent 104 may consist of, as a non-limiting example, fabric or other materials. In accordance with some embodiments of the invention the tent material is preferably light weight, low friction and snag resistant, limits echo, may insulate the interior, is static free, and can manage moisture. In further embodiments, the tent material is removable and portable.

The tent 104 may further provide one or more of the following features: an insect barrier; acoustic control, including sound deadening; temperature control, including enhanced thermal insulation; translucency, including the ability to adjust light transmission; air quality, including dust control; electric magnetic energy dissipation, visual ambiance, including color options, an easily maintained, including, for example, a replaceable fabric that can be cleaned or repaired.

As discussed above and illustrated in FIGS. 1 and 2, control system 108, in accordance with one embodiment of the invention, comprises main controller 110, control modules 112, sensors 114, environmental units 116 and manual controls 120. Control modules 112 may be manual controls that may be operated by the user but may also be automated controls operable by and responsive to the control system 108. The main controller 110 utilizes various inputs to drive a set of prescribed outputs. The inputs may be, for example, default programming (software/firmware) with standard presets, user modified inputs through the user station 106, control modules 112, and sensors 114. These outputs may provide commands to various environmental units 116 that will adjust the environmental conditions of the controlled environment in space 102. For example, sensors 114 may provide feedback (input) to the main controller 110 and programming (firmware/software) of the main controller 110 will provide the logic to adjust and maintain the desired controlled volume environment.

The environmental units 116 are, according to one embodiment of the invention, comprised of mechanical components and ducts that, in some embodiments, provide airflow management, and direct air modification via, for example, temperature, humidity, air movement speed, air quality, and other non-limiting potential modifiers to and from the controlled environment of space 102.

The programming of system 100, which in some embodiments may be accessible through the main controller 110 and may optionally be accessed by mobile devices, such as smart phones, tablets, voice and motion responsive devices, receives an activity instruction provided by the user based upon a desired experience, for example, sleep, short nap, ultra-quiet, cooler, warmer, etc. The integrated system 100 responds appropriately and in an integrated fashion to create an environment suitable for that activity within the personal space 102 inside tent 104.

To personalize the user experience, for example during an initial use, the system 100 prompts the user to initiate a preliminary environmental evaluation, where it monitors and learns about the user's habits, and sleep patterns. This is achieved using various sensors and settings. As the invention learns about the user it is able to use, for example, predictive intelligence, which allows it to make adjustments during use or to give suggestions to the user, further optimizing the experience. The system 100 may also have the capability to store information in control system 108 and to retrieve stored information on multiple users allowing it to customize any individual user's experience to their particular preferences.

In order to achieve user desired conditions, the system takes advantage of environmental controls and sensors by using them, at least optionally, in collaboration with one another. For example, the system 100 may sense noise levels and then monitor the user's reaction to them. In this example, some noises may be detrimental to sleep, while others are suitable for assisting in sleep activity. The system 100 may learn or be programed to respond to a user's reactions and optionally, allow a noise to persist or utilize noise cancelling technology to remove it from the user's perception in space 102. In other possible embodiments, sound may also be used for entertainment purposes through the use of one or more speakers placed in, or whose sound penetrates the inner tent volume of space 102.

The system may also control olfactory parameters in the personal space 102. Smell may be important to individualizing an environment for a specific activity or user. Many users respond to smells in different ways. In one example, information, including smell, from a sleep study may be used to enhance the user's experience.

During a sleep study an individual user might respond to body movement manipulation. At different intervals of sleep or at different points in the study, similar movements may have different effects on the user. In one example, with information gathered from the study, in combination or individually, predictive intelligence allows the system 100 to learn what movements best suit each user at different times or for different activities.

Video imaging may also optionally be used in some possible embodiments of the invention. For example, images can create strong impressions during sleep or study times. Video may also be used for entertainment purposes. Repetitive imagery can also be used, optionally to train an individual's subconscious. In this example, the use of video, still or otherwise, is allowed to purposefully imprint on the user.

The environment within personal space 102 may be adjusted to create an environment suitable for different users. Variables such as temperature, humidity, lighting, air movement, and air filtration, may all optionally be adjusted depending on user preferences or automated features. The effect these variables have on the user are saved and stored so that the correct combination of variables is used to produce the desired environment for different users.

The system and method of the present invention easily integrates the foregoing systems, components and methodologies as well as additional and different technologies for achieving a controlled environment in personal space 102 that provides a desired user experience.

Figure 2:
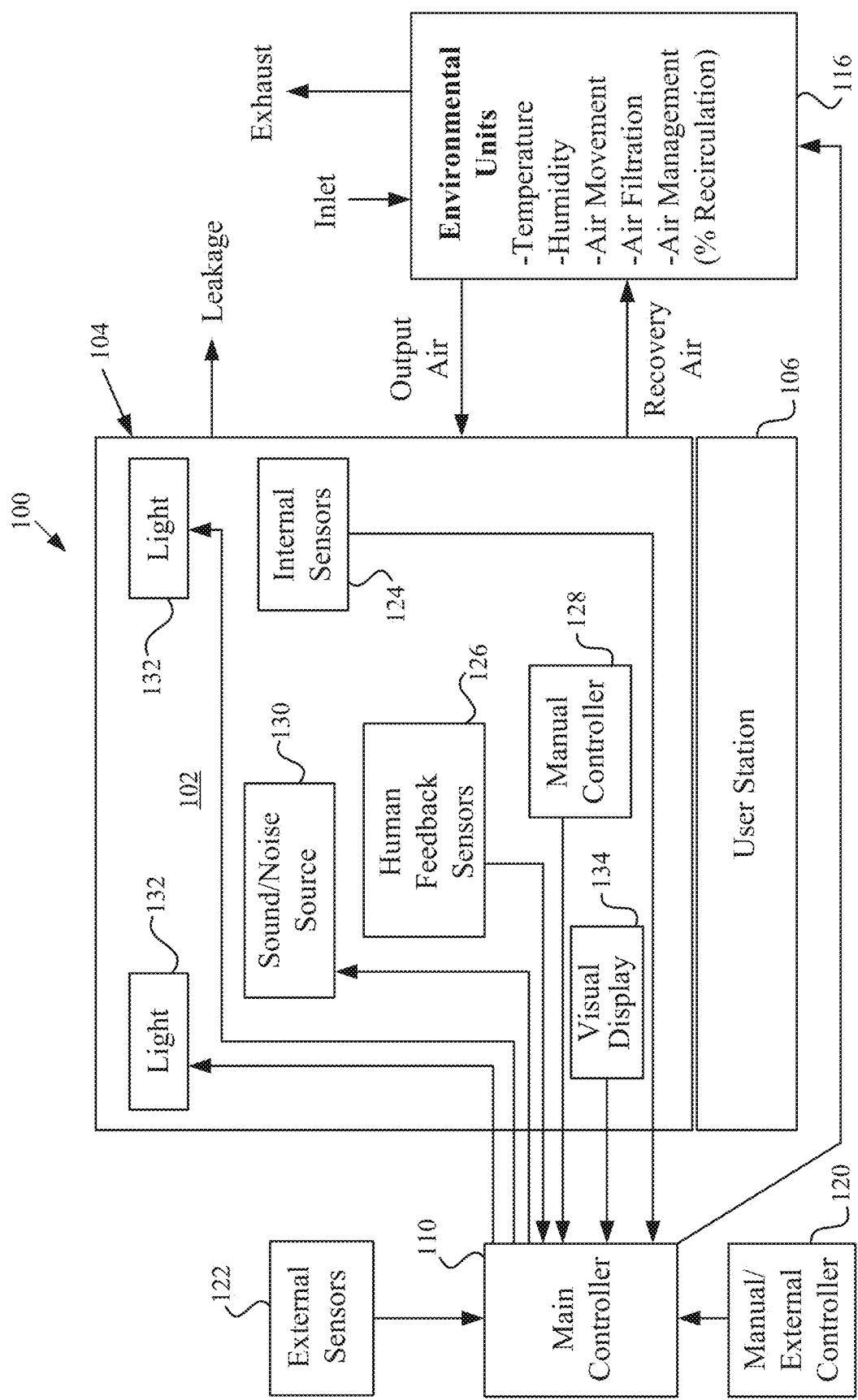
FIG. 2 is a block diagram illustrating aspects of the system of FIG. 1.

Referring to the block diagram of FIG. 2, tent 104 is represented as being attached to user station 106. As previously discussed, tent 104 may also enclose all or a portion of user station 106. The tent 104 provides a barrier, separating the outside world from the inner controlled environment of space 102. Tent 104 may be any shape conducive to attaching to or covering all or a portion of user station 106. For example, the overall shape may resemble a dome, a cube, a pyramid or any other shape. In at least one embodiment, the tent 104 is attached to an upper mechanism, such as a boom, which forms the upper limit of the tent, from there the tent 104 extends downward toward the user station 106. In additional examples, the tent 104 may simply rest on or near the user station 106. As depicted in FIG. 2, the user station 106 and the tent 104 meet at an outer edge of the user station 106. In additional examples however, the tent 104 may be larger or smaller than the user station 106. The tent 104 may also be constructed in any form to allow for it to create an inner volume used as the controlled environment of personal space 102. The tent 104 may include internal or external supports.

The material of tent 104 may also be made of any suitable fabric, including natural and synthetic materials. There may be points along the inside of the tent 104 to which various other components of the system 100 can attach. There also may be similar attachment points on the outside of the tent 104. For example, in one possible embodiment, a sensor 114 may attach to the tent 104. The tent 104 may include a door (not shown). The door, for example, may be a flap cut in the fabric, the flap being open or closed to allow for ingress or egress. The flap may, for example, use a zipper to allow it to be opened or closed. However, many other methods facilitating ingress and egress are possible. In other embodiments the tent 104 may be raised or lowered to allow the user to enter or exit space 102, and therefore not include a door.

The exterior of the enclosure, tent 104, may be any color. There may be fittings, sensors 114 or environmental units 116 located either on the outside of the tent 104 or extending from the outside to the inside of the tent 104. For example, an air inlet and output source, or port, may traverse the tent wall material. Such an air inlet and output could be connected to the environmental units 116. There may also be a port which allows air to exit tent 104.

As previously discussed with reference to FIG. 1, the system 100 includes user station 106. User station 106 is preferable the area where the user sits, lays, stands, or otherwise is positioned in personal space 102 inside the tent 104. The user station 106 may suitable for use by non-humans, including pets. For example, a veterinarian may utilize system 100 to accommodate recovering pets after a medical procedure. User station 106 may have additional functionalities, such as massage, movement, flexibility, heat control, etc. The user station 106 may be integrated into the tent 104 or tent 104 may be adapted to an existing user station 106. The user station 106 may also include sensors 114 for use in individualizing the user's experience within space 102.

As illustrated in FIG. 2, control system 108 receives and sends data and related instructions to and from various components in system 100. The control system 108 includes main controller 110, which may be a computer or microprocessor controlled device, although other examples may achieve the same or similar results using different components. The main controller 110 may utilize logic from specific programming to adjust outputs to the various environmental units 116 by using various inputs and user modified inputs. The main controller 110 may receive information or data from, for example, a manual or external controller 120, external sensors 122, internal (inside the tent 104) sensors 124, human feedback sensors 126, a manual controller 128 inside the tent 104, or any other device capable of sending information, instructions, data or other signals. The main controller 110 may also output information, instructions, data or other signals to, for example, a sound/noise device 128, lighting 130, and the environmental units 116. The environmental units 116 may control, for example, temperature, humidity, air movement, air filtration, air management, recirculation, etc. Inputs and outputs may be used in numerous ways to affect a range of changes. For example, an input may lead to calculation and or activation of or by the microcontroller (main control unit 110), which then in response leads to an output from the main controller 110 which leads to desired change in the environment in space 102. Another example includes a temperature sensor sending temperature information back to the main controller 110, the main controller 110 then references the current temperature against a stored or manually set optimal temperature, the main controller 110 then sends a request to the environmental units 116 (Command (on/off, wattage signals) to heat unit) to raise temperature in space 102 to achieve this desired temperature. Energy management and system stability logic in main controller 110 software will influence output signals (on/off/%/wattage) to the various system elements.

In accordance with an embodiment of the present invention, system 100 may include external sensors 122. The external sensors 122 may be any sensor(s) located outside of the tent 104. For example, a temperature sensor may be located outside of the tent 104. An additional, non-limiting example includes a noise sensor. The external sensors 122 may be connected to the main controller 110 such that data/signals flow from the sensor 122 to the main controller 110 and from the main controller 110 to the sensor 122. Many different types of sensors 122 may be incorporated into the system 100. The possibilities are not to be limited to only those listed in this disclosure and it is to be understood that any type of sensor used internally may also have an external variant. There may also be more than one of the same type of sensor. For example, there may be multiple external temperature sensors. These external sensors provide useful information to the main controller 110. For example, if the temperature outside the tent 104 is very high compared to the temperature inside space 102, the main controller 110 will instruct the environmental units 116 to work harder in order to maintain the temperature inside the tent 104. An external sensor 122, which senses external noises, then transmits that data to the main controller 110, which then allows for a noise canceling process in space 102 based on those external noises, via sound/noise source 130 in tent 104.

In accordance with yet further aspects of the present invention, system 100 may also include internal sensors 124. The internal sensors 124 include any sensor located inside tent 104. The sensors 124 are electrically coupled to the main controller 110. These sensors 124 may include, as non-limiting examples, human feedback sensors 126, sound and noise sensors 128, lighting sensors, oxygen sensors, $CO_2$ sensors, CO sensors, thermal sensors or any other type of sensor which assists in detecting and thereby providing the desired environment in space 102 for the user. Human feedback sensors 126, for example, can monitor the user, and her/his/its reaction to certain stimuli. Multiple sensors 124 may act together in order to provide useful information. For example, the noise and human feedback sensors can provide information to determine whether certain noises affect the user.

In accordance with still further embodiments, the system 100 may also include an external/manual controller 120. In some configurations the system 100 automatically achieves a user's desired environment in space 102. However, a user may desire a different environment at any given time. In order to achieve this altered environment in space 102, the user can make use of at least the external manual controller 120. The external manual controller 120 is electrically coupled, including wirelessly, to the main controller 110. This allows user inputs to be detected by the main controller 110 which can then process the request and send information to other components which facilitate the change in the environment of space 102. For example, a user profile may suggest she/he/it prefers a temperature of 68 degrees. However, on a specific day, the user may want to manually set the environment to 70 degrees and can do so by adjusting this setting on the manual controller 120. When the increased temperature is selected, the data is sent to the main controller 110 which in turn sends a request to the environmental units 116 to increase the temperature. The user may adjust any number of settings in an integrated fashion by using the manual external controller 120. By way of example, the external manual controller 120 may be mounted on a wall, to the boom to which the tent 104 is attached, or may be a mobile device. There may also be more than one external controller 120. For example there may be one external manual controller 120 mounted to the wall and the user may be using their smart device as a second external manual controller. In this example, the smart device is capable of being moved around, including inside the tent, while continuing to communicate with the main controller 110, for example, wirelessly via an application on the smart device. The manual controller 120 itself may take any number of forms, including switches, nobs, touch screens, other digital read outs, or any other type of display and adjustment mechanisms giving the user manual control over the environment. The user can also select from different settings, for example, nap, study, and sleep, each of which may correspond to a pre-set environmental setting.

The system 100, in accordance with a further embodiment, may include an internal manual controller 128. In accordance with a previously described embodiment, the internal manual controller 128 is similar in function to the external manual controller 120, in that it allows the user to adjust the environment in space 102 manually in an integrated fashion while inside tent 104. The internal manual controller 128 may be a controller mounted inside the tent 104. For example a control panel, optionally comprising a touch screen with options displayed on it. The internal manual controller may also be a user's smart device or an application there on. Other alternatives are available. The manual internal controller 128 is capable of connecting to the main controller 110 either by a physical connection or wirelessly. This allows the user to adjust the environment of space 102 from inside the tent 102. The user may also select from different settings, for example, nap, study, and sleep.

The system 100 may include human feedback sensors 126. While sensors 126 are labeled as human, it is to be understood that such sensors are biological sensors and that they may be sensors suitable for non-human life, such as pets and other animals. The human feedback sensors 126 allow the system 100 to sense the user's condition and learn about the user's responses to various stimuli, automatically adjust the environment of space 102 based on the user's sensed condition, and more. There may be one or more human feedback sensors 128. The human feedback sensors 128 are electrically coupled to the main controller 110. Non-limiting examples include thermal sensors, motion sensors, body scanners, video sensors, heart beat sensors, EKG, EEG, etc.

The system 100 may also include a sound sensor and/or source 130. The sound sensor and/or source 130 may be one device or separate devices. Regardless of their orientation, the sensor and/or source 130 is electrically coupled to the main controller 110. In one embodiment the sound sensor and source 130 is one device capable of both sensing and playing sounds. The device may also be capable of sound cancellation. In another example, the user may choose to play music through the sound source 130. In another example, the user profile may indicate they sleep most optimally when soothing tones are played at a specific volume. Those tones are produced by the sound source 130. There may be one or more sound sources or sensors 130 inside the tent 104. It is to be understood that, as used herein, the term "electrically coupled" includes wired and wireless coupling.

The system may also include one or more lights 132 inside the tent. In some embodiments the light 132 is electrically coupled to the main controller 110 and therefore capable of being automatically or manually controlled. Any type of light 132 may be used. For example, in some embodiments the light 132 may be capable of multiple colors, or true RGB color range. In additional embodiments, only white light is used. The light 132 also may be adjustable in intensity, in addition to color. For example, a user profile for sleep may slowly dim the lights 132 inside the tent 104, and then bring the intensity back up as the user gets closer to the time they are supposed to awaken. This is simply one example of many possible examples using the lights 132. The light 132 may also, optionally, be manually controlled from inside the tent 104. For example the light 132 may include intensity and/or an on-off switch.

The system 100 may also include a visual display 134. Display 134 may be located inside the tent 104 and be capable of displaying any type of image. For example it may be capable of displaying movies or still images. In addition, the display 134 may be capable of displaying information from the main controller 110, including current conditions, messages, etc. The display 134 may also be configured to show text messages, or any other message the user desires.

In accordance with further aspects of the present invention, system 100 includes environmental units 116. The environmental units 116 are capable of adjusting the environment of space 102 inside the tent 104. To that end, the environmental units 116 are electrically coupled to the main controller 110. The environmental units 116 are capable of, by way of a non-limiting example, air handling. In one example, the environmental units 116 comprises an inlet and outlet, allowing air to enter and leave the system 100, as well as an air output and an air recovery which lead to and from the tent 104. In this example this allows the environmental units 116 to retrieve air from the external environment, treat it to the desired specifications, and send it into the tent 104. At the same time, air is pulled from the tent 104, and exhausted out of the system 100. In this example, the system 100 works to achieve or maintain whatever internal environment the user desires in space 102. In other examples air may be taken from the tent 104, conditioned appropriately, and returned to the tent 104 without being exhausted. As a non-limiting example, the environmental units 116 are capable of adjusting temperature, humidity, air movement, air filtration, air management, level of recirculation, smell, etc. Any of these may be adjusted individually by a user by utilizing the main controller 110. The environmental units 116 may also work automatically, in association with the main controller 110, and other sensors attached thereto.

Figure 3:
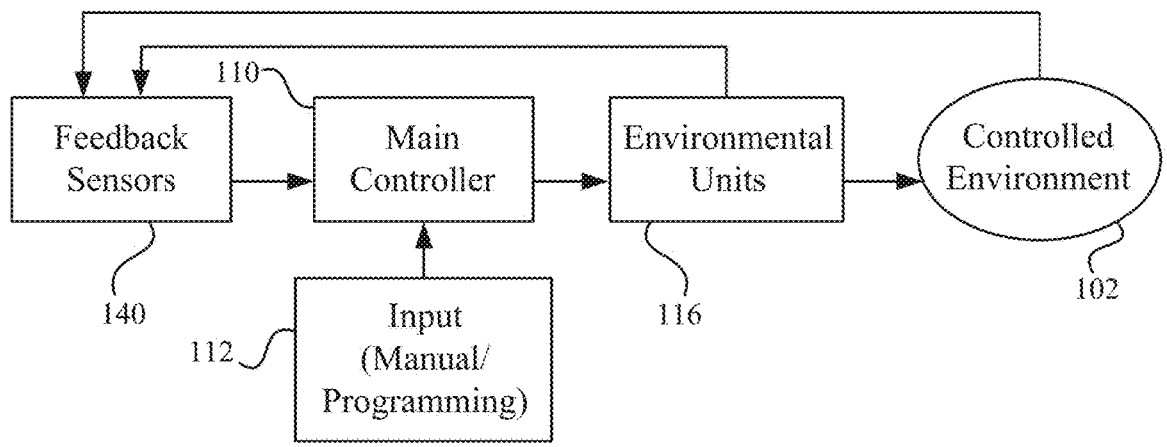
FIG. 3 is a block diagram illustrating further aspects of the system in FIG. 1.
Figure 5:
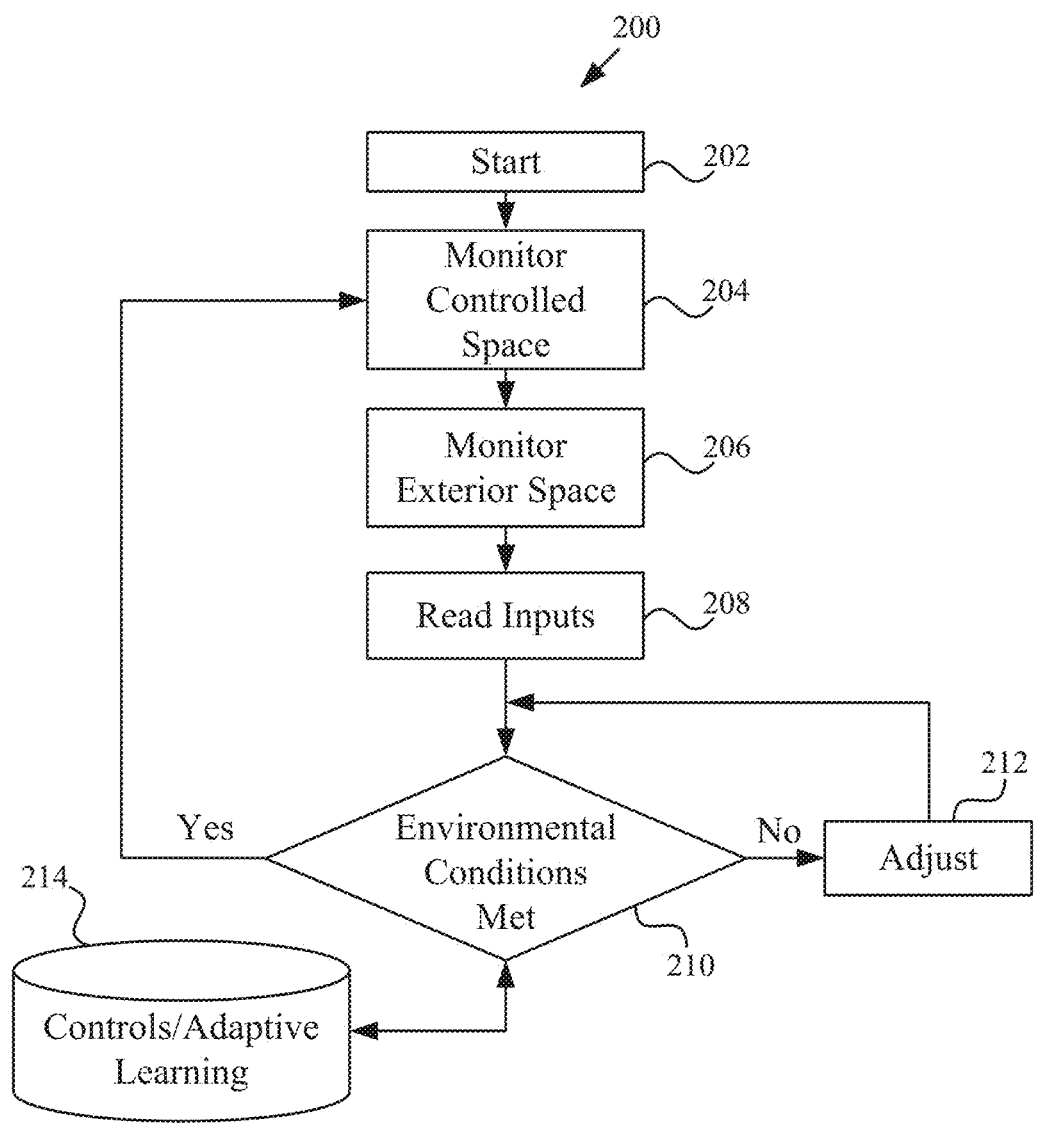
FIG. 5 is a flow chart illustrating various steps for an environmental control process according to an embodiment of the present invention; and, FIG. 6 is a flow chart illustrating various steps for an environmental control process according to yet another embodiment of the present invention.
Figure 6:
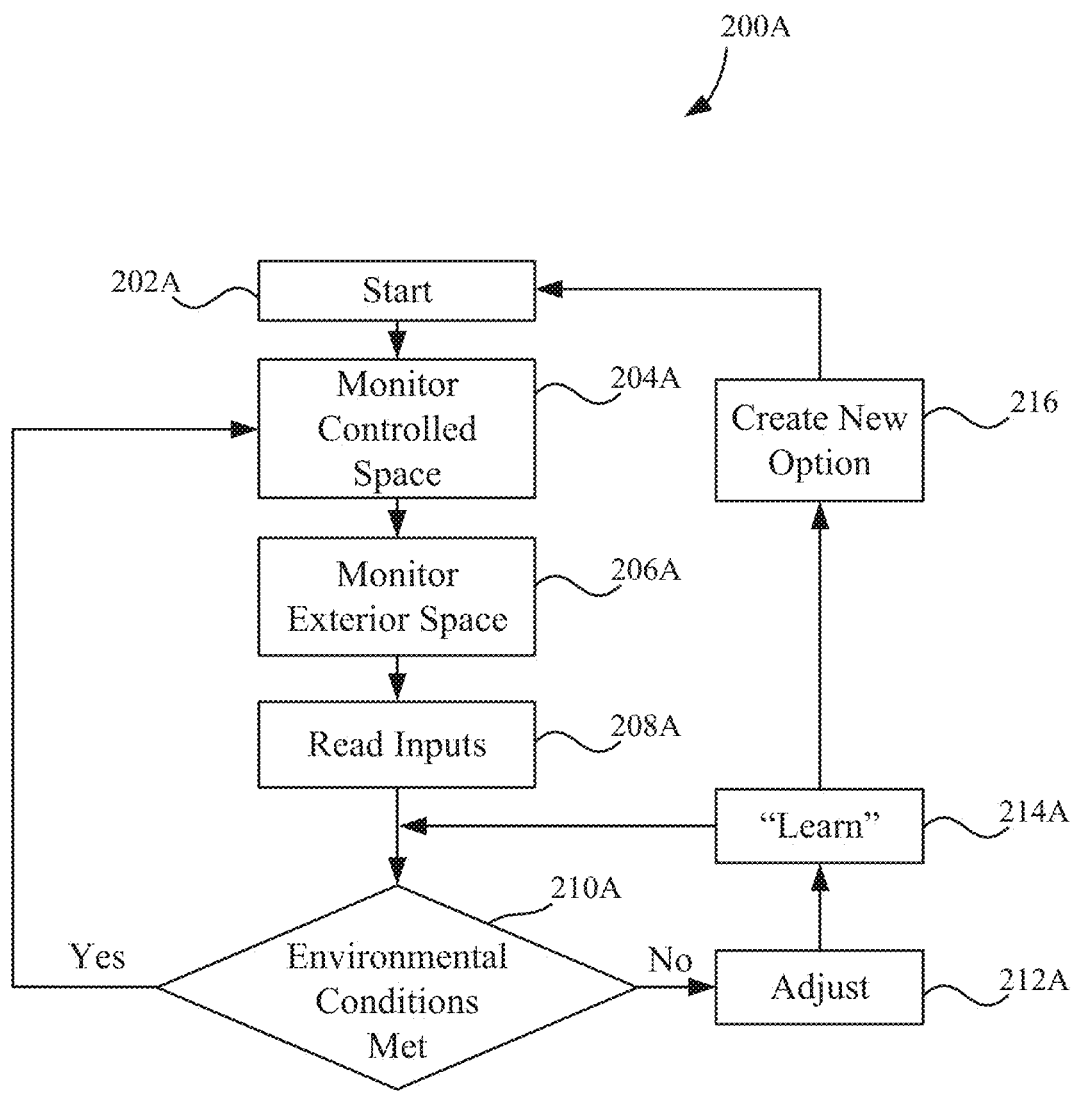

Turning to FIG. 3, a block diagram represents one possible embodiment of the present invention corresponding to a layout of components and how they may be interconnected to facilitate in the integrated operation of system 100 and method 200/200A (FIGS. 5 and 6). Feedback sensors 140 receive, or sense, information about the controlled environment in space 102. For example the current temperature of the controlled environment may be sensed. The feedback sensors 140 also receive data from the environmental units 116. The feedback sensors 140 then send their sensed data to the main controller 110. The main controller 110 processes that data and determines the appropriate response. That response is sent to the environmental units 116. The main controller 110 may also receive a request from a manual/programming input (control module 112). For example, a pre-set could be triggered by the user entering the tent 104, in which case the main controller 110 relies on a pre-set input, and in turn sends information to the environmental units 116 to achieve those presets, for example humidity percentage.

The environmental units 116 receive requests from the main controller 110 corresponding to environment changes desired for the controlled environment in space 102. By way of example, the feedback sensors 140 sense that the current temperature in the controlled environment of space 102 is 70 degrees. That information is sent to the main controller 110. The main controller 110 references the 70 degree sensed temperature against either a previously programmed temperature, or a manually inputted temperature. Any disparity between the desired temperature and the sensed temperature triggers a request to the environmental units 116. The environmental units 116 will then respond by conditioning the air in accordance with the main controller 110 request and supply conditioned air into the controlled environment of space 102. In the current example, the program could call for 68 degrees, the main controller 110 would request colder air be sent from the environmental units 116 to the controlled environment, the environmental units 116 would send that air until the feedback sensor reads 68 degrees, at which time it will halt the process. As in all other examples and description herein, the arrows are representative only, and data, signals and other information is capable of traveling in either direction.

Figure 4:
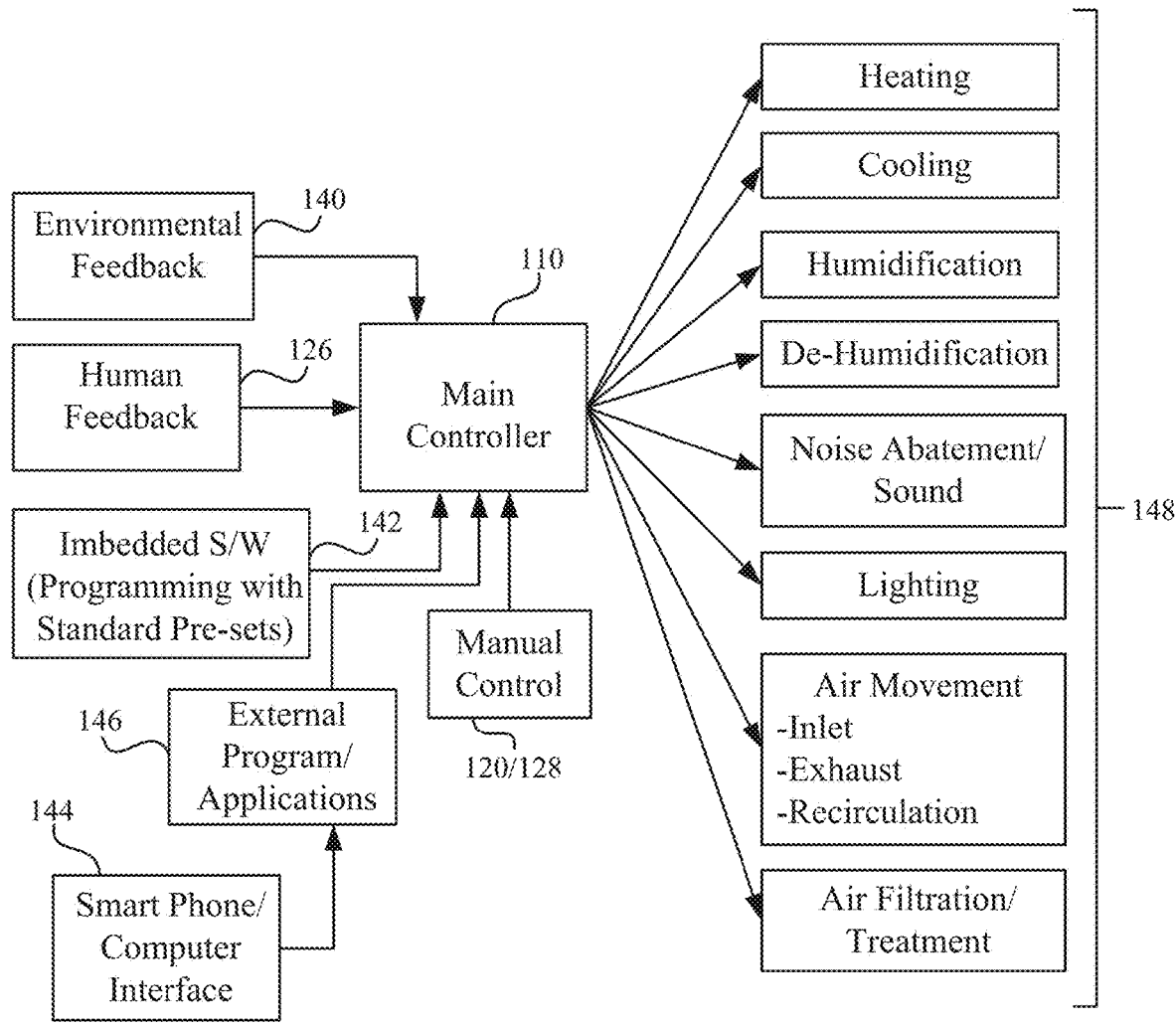
FIG. 4 is a block diagram illustrating still further aspects of the system in FIGS. 1, 2 and 3.

Turning next to FIG. 4 a block diagram representatively illustrates the layout of, and inputs and outputs associated with, the main controller 110. As illustrated, the main controller 110 may receive data, signals, information, instructions, etc. (collectively data) from, for example, the environmental feedback sensors 140, human feedback sensors 126, imbedded software or standard pre-sets 142, manual controller 120/128, or external applications 146 on a smart device 144. The main controller 110 may also send data to these devices. As illustrated, the main controller 110 may send data to the following units, or to the unit capable of achieving the following: heating, cooling, video, messages, humidification, de-humidification, noise abatement, sound, lighting, air movement, air filtration, air treatment 148. As in other examples, the data arrows in the figures are representative only, and data may be capable of traveling in either direction.

FIG. 5 illustrates a process 200 for providing a controlled environment according to an embodiment of the present invention. Process 200 is initiated at START block 202. The controlled space (102) is monitored at step 204 and the exterior space is monitored at step 206. The output of blocks 204 and 206 are inputted and read at step 208. The step of determining whether environmental conditions (within space 102) are met occurs at step 210. If environmental conditions are not met (NO), adjustments to the monitored inputs are made at step 212 and the step 210 is repeated. If the conditions are met at step 210 (YES), the process returns to step 204 and continues to monitor the controlled space (102). The process 200 preferable also includes systems learning capability at step 214.

FIG. 6 illustrates a process 200A for providing a controlled environment according to another embodiment of the present invention. Process 200A is initiated at START block 202A. The controlled space (102) is monitored at step 204A and the exterior space is monitored at step 206A. The output of monitoring blocks 204A and 206A are inputted and read at step 208A. The step of determining whether environmental conditions (within space 102) are met occurs at step 210A. If conditions are not met (NO), adjustments to the monitored inputs are made at step 212A and system enters learning step 214A. An output from step 214A is returned to step 210A where process 200A determines if environmental conditions are met. Another output for the learning step 214A is applied to step 216 in which process 200A creates a new option for use by the process 200A. If step 210A determines environmental conditions have been met (YES), the process 200A returns to step 204A to continue monitoring the controlled space (102) at step 204A.

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

We claim:

1. An apparatus for controlling a micro-environment for a single user, the apparatus comprising:
    a floor-less portable structure, configured to be placed over an existing surface selected from a group of surfaces comprising an indoor floor, an outdoor floor, and outdoor ground, the floor-less portable structure comprising a tent made of a fabric material and having an inner volume, wherein the fabric material is not tethered to the surface, the inner volume and the existing surface defining an enclosed personal space for a user, the personal space having an environment being adaptable to and adjustable by the single user and separate from the external environment outside of the enclosed personal space;
    a user station disposed within and forming at least a portion of a boundary wall of the inner volume of the portable structure, wherein the portable structure, the user station, and the indoor floor, defines a boundary to establish a controlled user environment in the personal space corresponding to the inner volume inside the portable structure;
    an environmental control system for controlling the controlled user environment in the enclosed personal space, the environmental control system configured to be located within the personal space and comprising at least a processor embedded within the environmental control system, one internal sensor within the portable structure and one external sensor outside the portable structure, at least one of the internal and external sensors including a noise sensor configured to detect a noise, the processor being coupled to the noise sensor and a noise source within the enclosed personal space, the noise source configured to cancel the detected noise within the enclosed personal space in response to a signal from the processor, the processor electronically coupled to the at least one internal sensor and at least one external sensor, and further coupled to an environmental unit, the processor further configured with user programmable software instructions for controlling and adjusting environmental parameters including temperature, humidity, lighting, air quality, air movement, and air filtration, where the instructions cause the system to:
        (a) sense a condition at a sensor;
        (b) compare the sensed condition relative to a user defined input;
        (c) send control instructions to the environmental units based on any variance between the sensed condition and the user defined input; and
    a user operated manual control, separate from the environmental control system, for controlling and adjusting environmental parameters including temperature, humidity, lighting, air quality, air movement, and air filtration.

2. The apparatus of claim 1, wherein the portable structure is removable from the personal space.

3. The apparatus of claim 2, wherein the portable structure is a tent.

4. The apparatus of claim 2, wherein the portable structure is made of replaceable fabric.

5. A system for controlling a user environment, the system comprising:
    a floor-less portable structure, configured to be placed over an existing surface selected from a group of surfaces comprising an indoor floor, an outdoor floor, and outdoor ground, comprising a tent made of a fabric material, wherein the fabric material is not tethered to the surface, and having an inner volume defining an enclosed personal space for a user and an outer side, the inner volume including:
    a user station disposed within the inner volume and forming at least a portion of a barrier defining the enclosed personal space;
    at least two sensors; wherein at least one of the sensors is a sound sensor configured to detect a noise, coupled to a main controller, the main controller coupled to at least one port, the at least one port disposed between the inner volume and the outer side, and further coupled to the main controller, the main controller being coupled to the noise sensor and a noise source within the enclosed personal space, the noise source configured to cancel the detected noise within the enclosed personal space in response to a signal from the main controller;
    at least one external sensor coupled to the main controller; and
    a manual controller coupled to the main controller to detect user inputs by the main controller and then process and send information to other components to change the user environment within the enclosed personal space, wherein the main controller instructs the at least one port for controlling and adjusting environmental parameters of the user environment including temperature, humidity, air quality, air movement, and air filtration, based at least on information received from the manual controller and the at least one external sensor.

6. The system of claim 5, wherein one of the main and manual controllers is located inside the inner volume and the other one of the main and manual controllers is located outside the inner volume.

7. The system of claim 5, wherein one of the main and manual controllers is portable and is moveable inside and outside the inner volume, and wherein at least one of the sensors is a sleep monitor.

8. A method for controlling a portable user environment, the method comprising the steps of:
    locating a floor-less portable structure, configured to be placed over an existing surface selected from a group of surfaces comprising an indoor floor, an outdoor floor, and outdoor ground, the floor-less portable structure, comprising a tent made of a fabric material and having an inner volume, wherein the fabric material is not tethered to the surface, the inner volume and the existing indoor floor defining an enclosed personal space for a user, the personal space having an environment being adaptable to and adjustable by the single user and separate from the external environment outside of the enclosed personal space, at a user space;
    monitoring a controlled volume and generating first output signal representative of parameters defining the controlled volume, wherein at least one of the parameters is sound;
    monitoring an exterior volume and generating second output signal representative of parameters defining the external volume;

determining, using the first and second output signals, whether desired environmental conditions of the controlled volume have been satisfied;

adjusting an environmental control system for the controlled user environment in the enclosed personal space in response to determining whether desired environmental conditions have been satisfied, the environmental control system configured to be located within the personal space and comprising at least a processor embedded within the environmental control system, one internal sensor within the portable structure and one external sensor, at least one of the internal and external sensors including a noise sensor configured to detect a noise, the processor being coupled to the noise sensor and a noise source within the enclosed personal space, the noise source configured to cancel the detected noise within the enclosed personal space in response to a signal from the processor, the processor further coupled to an environmental unit, the processor further configured with user programmable software instructions for controlling and adjusting environmental parameters including temperature, humidity, lighting, air quality, air movement, and air filtration, where the instructions cause the system to:

(a) sense a condition at a sensor;
(b) compare the sensed condition relative to a user defined input;
(c) send control instructions to the environmental units based on any variance between the sensed condition and the user defined input adjusting at least one of the first and second output signals if the desired environmental conditions of the controlled volume have not been met; and if the desired environmental conditions are not met, learning from the adjusting of the at least one of the first and second output signals, further comprising: 1) determining again if environmental conditions are met, and 2) creating a new option for the method and performing again the steps of the method until the desired environmental conditions are met.

* * * * *